A. & E. Hodgson,
Corn Planter.
No. 92,826. Patented July 20, 1869.
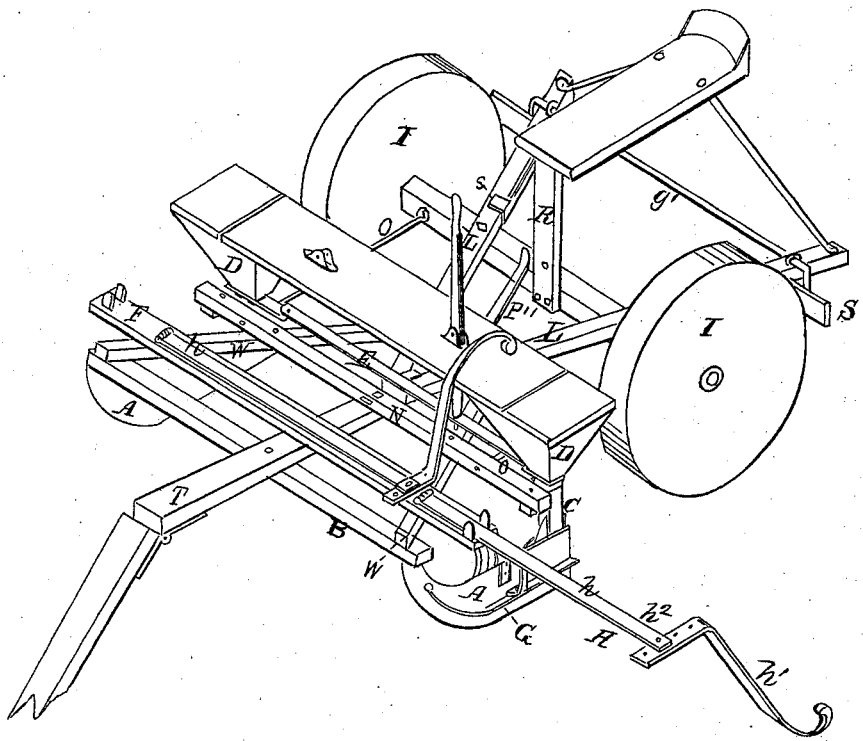
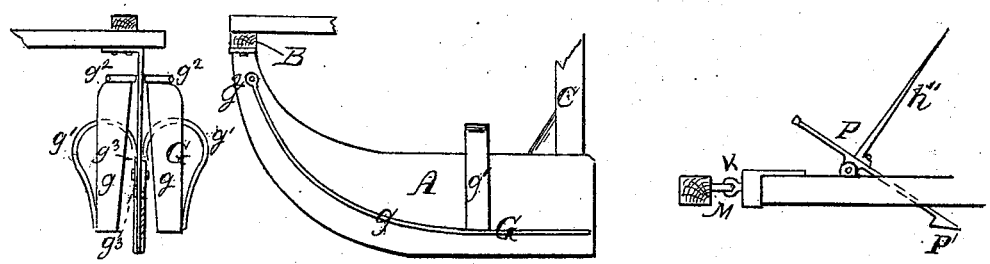
Witnesses
Rufus Choate
C. W. Campbell
Inventor
A. & E. Hodgson
by E. Whitman
atty

United States Patent Office.

ALBERT HODGSON AND EDWIN HODGSON, OF EL PASO, ILLINOIS.

Letters Patent No. 92,826, dated July 20, 1869.

IMPROVEMENT IN CORN-PLANTER.

The Schedule referred to in these Letters Patent and making part of the same.

*To all whom it may concern:*

Be it known that we, ALBERT HODGSON and EDWIN HODGSON, of El Paso, in the county of Woodford, and State of Illinois, have invented a new and useful Improvement in Corn-Planters; and that the following, taken in connection with the accompanying plate of drawings, hereinafter referred to, forms a full and exact specification of the same, wherein we have set forth the nature and principles of our said improvement, by which our invention may be distinguished from others of a similar class, together with such parts as we claim, and desire to secure by Letters Patent.

Our invention relates to that class of corn-planters in which the runners are used to prepare and mark the furrows, and in which the wheels are made broad to serve as covering-rollers; and consists in certain modifications in the details of the same, whereby the depth of the furrow may be accurately regulated, and the runners raised from the ground while turning.

In the accompanying plate of drawing, which illustrates our invention, and forms a part of the specification thereof, Figure 1 is a perspective view.

Figure 2 is a side view of the runner or furrow-opener, with the attachments for regulating the depth of the furrows applied thereto.

Figure 3 is a front view of the said runner and appliance.

Figure 4 represents the device by which the runners are held in position when raised from the ground.

Like figures represent like parts in all the illustrations.

The component parts of the implement are constructed, arranged, and applied as follows, to wit:

A represents the runners or furrow-openers, which are of the usual form, and are attached to the cross-bars B of the frame and the vertical standards C.

The said standards C are hollow, to allow the passage of the corn, and are connected and arranged with the hopper D containing the corn to be planted, and the reciprocating bar E, in the usual manner.

G represents the appliances made use of for regulating the depth of the furrow. It consists of the curved plates $g$ $g$, which gradually taper toward the rear, and are connected with the said runners by means of the springs $g^1$ $g^1$.

The said curved plates are pivoted to the runners aforesaid at $g^2$, and the said springs are provided with slots, $g^3$, cut a certain distance apart, so that by holding the said springs to the said runners, the curved plate aforesaid may be adjusted in such a manner as to regulate exactly the depth of the furrow.

H is the indicator or marker, and consists of the bar $h$, which is hinged to cross-piece F of the frame, in such a manner as to be opened or folded, as represented in fig. 1.

The marker $h^1$ is of curvilinear form, and is secured at right angles to the bar $h$, by means of a bolt at $h^2$.

The rear part of the frame is supported by the wheels I, made broad to act as covering-rollers, and is coupled to the forward part of the frame by means of the eye-bolt K, secured to the clamp, which joins the ends of the bars L and the staple M, attached to the cross-bar N.

The bolts $o$, attached to staples in the axle P and cross-bar N, prevent the said rear part from being thrown out of position.

P is a spring-catch, revolving upon a cylindrical bar, which has its bearings in journal-boxes or staples upon the bar L.

The hook $p'$ of the said catch forms a support for the forward part of the frame, when the same is raised from the ground, and is held in position by means of the spring $p''$, which catches in a notch cut in the standard R of the driver's seat.

The scrapers S are attached by treadles, which operate a double crank, S', connected with the same.

The draught-plate T is hinged at $t$, in order to render the forward part of the implement pliant and flexible.

The operation of our invention is as follows:

The depth of the furrow is regulated by securing the appliance G in the position required, as aforesaid, and the direction of the furrow is established by the marker H, the curved arm $h^1$ of which trails upon the ground, and indicates the distance of the furrows from each other.

When it is necessary to turn the implement, the forward part of the same is held above the ground by the spring-catch P, the hook $p'$ of which catches under the cross-bar, connecting the rear ends of the diagonal bars W, the said catch being held in position by the spring $p''$.

Having thus described the construction and operation of our invention, we will set forth those parts of the same which we claim as new, and desire to secure by Letters Patent in the following clauses, to wit:

1. We claim the appliance G, composed of the curved plate $g$, hinge $g^2$, and spring $g^1$, substantially as described.

2. We claim the said appliance G, in combination with the runner A.

3. We claim the device P, composed of the hook $p'$ and the spring $p''$, when arranged and applied as herein set forth, for the purpose of holding the runners above the ground in turning.

ALBERT HODGSON.
EDWIN HODGSON.

Witnesses:
J. H. MOORE,
GEO. W. DALY.